(12) United States Patent
Haynes et al.

(10) Patent No.: US 9,053,468 B2
(45) Date of Patent: Jun. 9, 2015

(54) METHODS AND SYSTEMS FOR MONITORING OPERATION OF EQUIPMENT

(75) Inventors: Leon Ericson Haynes, Virginia Beach, VA (US); Charles Edgar Tackett, Chesapeake, VA (US)

(73) Assignee: General Electric Company, Schenectady, NY (US)

( * ) Notice: Subject to any disclaimer, the term of this patent is extended or adjusted under 35 U.S.C. 154(b) by 420 days.

(21) Appl. No.: 13/082,086

(22) Filed: Apr. 7, 2011

(65) Prior Publication Data

US 2012/0259585 A1    Oct. 11, 2012

(51) Int. Cl.
| | |
|---|---|
| G06F 15/00 | (2006.01) |
| G06Q 10/00 | (2012.01) |
| G06Q 50/30 | (2012.01) |
| G06Q 10/06 | (2012.01) |

(52) U.S. Cl.
CPC ............... *G06Q 10/20* (2013.01); *G06Q 50/30* (2013.01)

(58) Field of Classification Search
USPC .......................................... 702/182
See application file for complete search history.

(56) References Cited

U.S. PATENT DOCUMENTS

| | | | |
|---|---|---|---|
| 5,877,743 A | 3/1999 | Dzik | |
| 6,366,199 B1 | 4/2002 | Osborn et al. | |
| 6,470,258 B1 * | 10/2002 | Leamy et al. | 701/100 |
| 6,498,978 B2 * | 12/2002 | Leamy et al. | 701/100 |
| 7,693,643 B2 * | 4/2010 | Kim et al. | 701/100 |
| 2005/0075769 A1 | 4/2005 | Eschborn et al. | |
| 2007/0107695 A1 | 5/2007 | Kuo et al. | |
| 2008/0004904 A1 * | 1/2008 | Tran | 705/2 |
| 2008/0255774 A1 * | 10/2008 | Liu et al. | 702/34 |
| 2012/0259585 A1 * | 10/2012 | Haynes et al. | 702/182 |

OTHER PUBLICATIONS

Search Report and Written Opinion from EP Application No. 12162997.6 dated Jul. 12, 2012.
Examination Report from New Zealand Patent Application 599241 dated Sep. 4, 2013.

* cited by examiner

*Primary Examiner* — Jonathan C Teixeira Moffat
*Assistant Examiner* — Stephanie Chang
(74) *Attorney, Agent, or Firm* — Armstrong Teasdale LLP (57) ABSTRACT

A condition assessment system for use in monitoring the operation of at least one of a plurality of units included within a fleet of substantially similar units is described. The system includes an input device configured to receive a selection of at least one source of data related to the operation of at least one of the plurality of units. The system also includes at least one sensor associated with the at least one source of data and configured to sense data related to the operation of at least one of the plurality of units. The system also includes a condition assessment device configured to receive data from the at least one sensor, sample data associated with at least one data parameter from the received data, and generate a baseline parametric curve from the data associated with the at least one sampled data parameter.

20 Claims, 3 Drawing Sheets

METHODS AND SYSTEMS FOR MONITORING OPERATION OF EQUIPMENT

BACKGROUND OF THE INVENTION

The embodiments described herein relate generally to monitoring equipment, and more specifically to condition assessment systems used to analyze operation of the equipment.

A condition assessment system may be used to monitor the operation of equipment. At least some known condition assessment systems include stored parametric curves that represent a baseline of normal operation of the equipment. Sensors included within the equipment provide outputs that are compared to the parametric baseline to detect anomalous operating conditions and/or shifts in equipment operations.

For fleet equipment, defined herein as equipment manufactured and sold for use in a plurality of remotely-located facilities (i.e., not one-off custom equipment), a fleet rule package includes generic parametric baseline curves for the equipment. Such generic parametric baseline curves may be based on average conditions in which the equipment may operate. However, variations in the local environment, variations in maintenance schedules, and/or other operational variations may cause equipment installed in a first facility to operate significantly differently than equipment installed in a second facility or within an individual site. In such cases, the actual operation of the equipment may mistakenly be interpreted as faulty operation if the operation varies enough from the parametric baseline curves within the fleet rule package, even though the operating variation may be caused by factors related to the local environment, rather than a result of equipment malfunction. False alarm signals may be generated when the sensor outputs from such equipment are compared to a baseline curve representative of normal operation of that equipment. Typically, to counteract such inaccuracies in the parametric baseline curves, the parametric baseline curves are manually maintained to ensure that the parametric baseline curves accurately represent proper operation of the equipment in the environment in which the equipment is installed. However, depending on the location of the equipment, the local environment in which the equipment is operating, the maintenance schedules, and other factors, maintaining the accuracy of such curves may be a time-consuming and difficult task.

BRIEF DESCRIPTION OF THE INVENTION

In one aspect, a condition assessment system for use in monitoring the operation of at least one of a plurality of units included within a fleet of substantially similar units is provided. The system includes an input device configured to receive a selection of at least one source of data related to the operation of at least one of the plurality of units. The system also includes at least one sensor associated with the at least one source of data and configured to sense data related to the operation of at least one of the plurality of units. The system also includes a condition assessment device that is configured to receive data from the at least one sensor, sample data associated with at least one data parameter from the received data, and generate a baseline parametric curve from the data associated with the at least one sampled data parameter.

In another aspect, a method of maintaining a baseline parametric curve representing normal operation of a first unit is provided. The first unit is one of a plurality of substantially similar units included in an equipment fleet. The method includes receiving a selection of at least one source of data related to operation and performance of the unit and receiving data from the at least one selected source of data. The method also includes sampling data associated with at least one data parameter from the received data and determining the baseline parametric curve by fitting a curve to the data associated with at least one sampled data parameter.

In yet another aspect, a condition assessment device for monitoring operation and performance of at least one of a plurality of units included within a fleet of substantially similar units is provided. The device includes a processing device configured to store at least one code segment. The at least one code segment is configured to instruct the processing device to receive a selection, from an input device, of at least one source of data related to the operation of at least one of the plurality of units. The at least one code segment is further configured to receive data from at least one sensor associated with the at least one source of data and to sample data associated with at least one data parameter from the received data. The at least one code segment is further configured to generate a baseline parametric curve from the data associated with the at least one sampled data parameter.

DETAILED DESCRIPTION OF THE INVENTION

The methods and systems described herein enable a baseline parametric curve, representing normal operation of a unit, to be accurately maintained, wherein the unit is one of a plurality of substantially similar units included in an equipment fleet. More specifically, the methods and systems described herein enable a generic fleet rule package to be modified to more accurately represent the operation and performance of an individual unit within the fleet. The modifications may be based on an operating environment and/or machine conditions of the individual unit. The methods and systems described herein enable the generation and use of individualized baseline parametric curves, without manually updating and/or maintaining the baseline parametric curves for each individual unit. Automatically maintaining the baselines and associated alarm set points, provides a commercial advantage by not requiring a facility's maintenance engineer to manually maintain baseline curves of units within their associated facility. The disclosure is described as applied to exemplary embodiments, namely, systems and methods for maintaining parametric baseline curves for a fleet of equipment. However, it is contemplated that this disclosure has general application to condition assessment systems in industrial, commercial, and residential applications.

Technical effects of the methods and systems described herein include at least one of: (a) receiving a selection of at least one source of data related to the operation of the unit; (b) receiving data from the at least one selected source of data; (c) sampling data associated with at least one data parameter from the received data; and (d) determining the baseline parametric curve by fitting a curve to the data associated with the at least one sampled data parameter.

Figure 1:
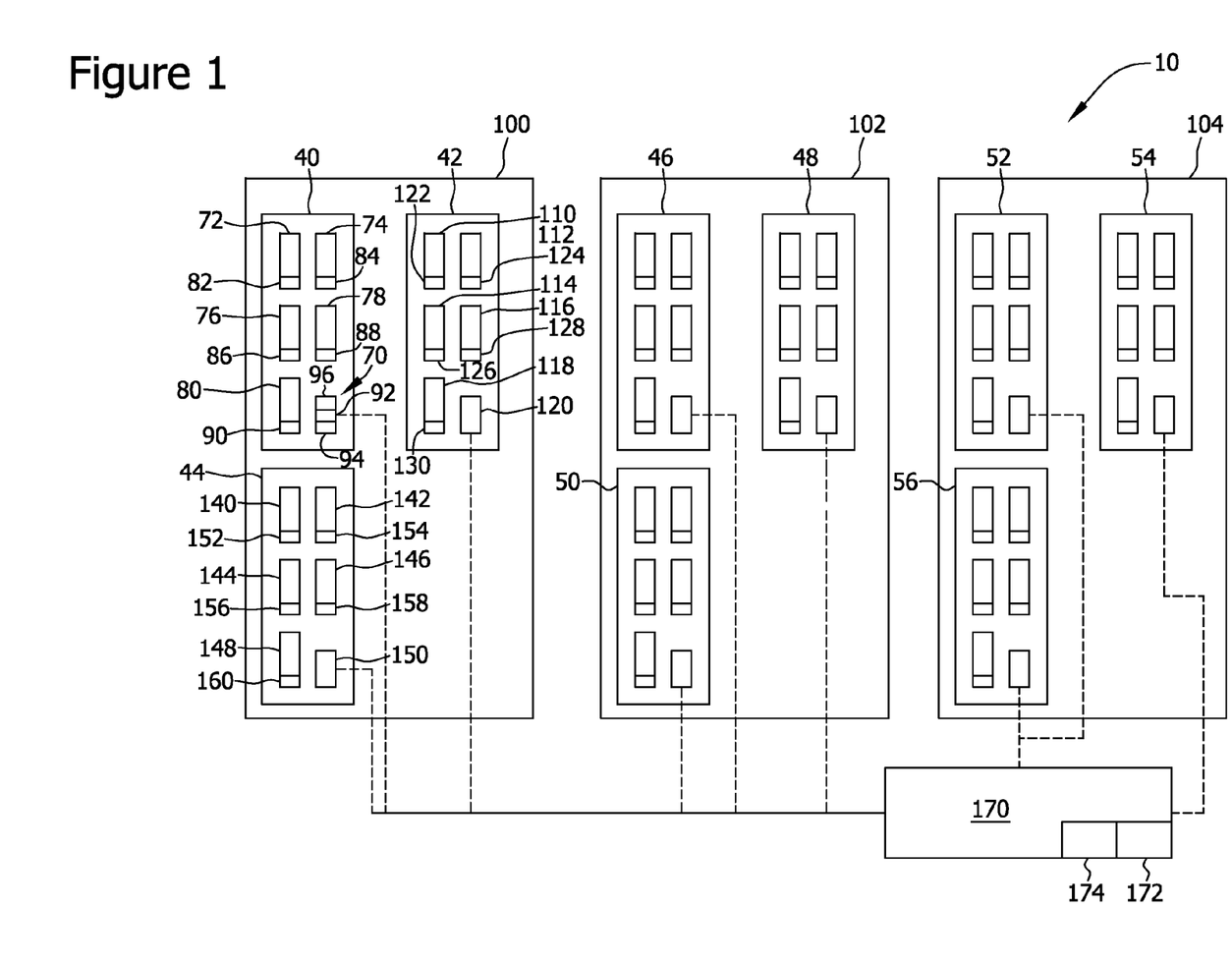
FIG. 1 is a block diagram of an exemplary condition assessment system.

FIG. 1 is a block diagram of an exemplary condition assessment system 10 for use in monitoring performance of equipment and for maintaining baseline parametric curves used to analyze operation and performance of the equipment. In the exemplary embodiment, condition assessment system 10 includes at least one condition assessment device 12 and a plurality of data sensors 14. Moreover, in the exemplary embodiment, condition assessment system 10 monitors the operation of fleet equipment. Fleet equipment is defined herein as equipment manufactured and sold for use in a plurality of remotely-located facilities (i.e., not one-off custom equipment), such as, for example, a first facility 40, a second facility 42, a third facility 44, a fourth facility 46, a fifth facility 48, a sixth facility 50, a seventh facility 52, an eighth facility 54, and a ninth facility 56. In the exemplary embodiment, condition assessment system 10 may be configured to monitor the performance of a first type of unit, a second type of unit, and a third type of unit. Although described herein as monitoring performance of three types of units included within nine facilities, condition assessment system 10 may monitor performance of any suitable number of unit types included within any suitable number of facilities.

In the exemplary embodiment, each condition assessment device 12, for example 70, 120, and 150, included within condition assessment system 10 includes a local condition assessment device 70. Furthermore, in the exemplary embodiment, first facility 40 includes a first unit 72, a second unit 74, a third unit 76, a fourth unit 78, and a fifth unit 80. More specifically, and as an example only, first unit 72 and second unit 74 are the first type of unit monitored by condition assessment system 10, third unit 76 and fourth unit 78 are the second type of unit monitored by condition assessment system 10, and fifth unit 80 is the third type of unit monitored by condition assessment system 10. In the exemplary embodiment, first facility 40 is a power generation facility and units 72, 74, 76, 78, and 80 are components of the power generation facility. However, although the condition assessment system 10 is described in connection with a plurality of power generation facilities, the methods and systems described herein are applicable to other applications, including, but not limited to, aircraft, marine, and industrial applications.

In the exemplary embodiment, each unit 72, 74, 76, 78, and 80 includes at least one of the plurality of data sensors 14, for example 82, 84, 86, 88, and 90, configured to sense selected data parameters related to the operation and performance of the associated unit and/or first facility 40. For example, first unit 72 includes a first data sensor 82, second unit 74 includes a second data sensor 84, third unit 76 includes a third data sensor 86, fourth unit 78 includes a fourth data sensor 88, and fifth unit 80 includes a fifth data sensor 90. Data sensors 14 may include any group or number of sensors 14 that can monitor data parameters of interest. Such parameters of interest may include, but are not limited to, ambient temperature, exhaust gas temperature, oil temperature, component temperatures such as high pressure turbine shroud temperature, fuel flow, core speed, compressor discharge pressure, turbine exhaust pressure, and fan speed.

Local condition assessment device 70 includes a processing device 92 that receives data from data sensors 82, 84, 86, 88, and 90. In the exemplary embodiment, local condition assessment device 70 also includes a memory device 94. Memory device 94 may be coupled to, or included within, processing device 92. Furthermore, local condition assessment device 70 may include an input/output device 96 for use in receiving an input from a user. For example, input/output device 96 may include a keyboard, a mouse, a touch screen, a track pad, a button, and/or any other device that enables condition assessment system 10 to function as described herein. More specifically, input/output device 96 may display a graphical user interface to the user and/or may receive a selection of at least one of the plurality of data sensors 14 from the user.

In the exemplary embodiment, local condition assessment device 70 is programmed to process the data signals received from data sensors 82, 84, 86, 88, and 90 for monitoring performance characteristics of each respective unit 72, 74, 76, 78, and 80. For example, local condition assessment device 70 may be configured to continuously monitor the output of data sensors 82, 84, 86, 88, and 90 by sampling data associated with a predetermined data parameter sensed by data sensors 82, 84, 86, 88, and 90. The sampled data parameters are used in diagnostic trending analysis for monitoring performance of the unit associated with the data sensor that collected the data. More specifically, the sampled data parameters are trended against reference data, to monitor performance of the unit. For example, the sampled data parameters are compared to a stored parametric baseline associated with the type of data being analyzed.

In the exemplary embodiment, local condition assessment device 70 may analyze data received from data sensor 82, in order to monitor performance of first unit 72, and may analyze data received from data sensor 84 to monitor performance of second unit 74. As described above, first unit 72 and second unit 74 are the same type of unit. For example, units 72 and 74 may both be the same model of compressor. Local condition assessment device 70 may also combine data received from data sensor 82 and data sensor 84, and/or analyze performance units 72 and 74 based on the combined data. For example, if data collected by data sensor 82 varies from a stored parametric baseline, local condition assessment device 70 may determine that first unit 72 is not functioning properly. However, if data collected from first unit 72 and data collected from second unit 74 varies from the stored parametric baseline in a substantially similar manner, such data may be an indicator that the stored parametric baseline for the associated parameter is not accurately representing proper operation of the units.

Typically, the original, stored parametric baseline (i.e., the parametric baseline curve included within the generic fleet rule package) for each type of unit in a fleet of units describes how that unit should perform in average conditions and with performance of standard recommended maintenance. However, individual units of each type of unit may not be installed in the same operating environment or may not be operated under the same conditions as the units used to determine the stored parametric baseline. Real-world operation of the units may vary from the stored parametric baseline, and therefore, comparing real-world operation of the units to the stored parametric baseline may not provide an accurate indication of a deviation from proper operation of the unit. Determining an adjusted and/or new baseline, also referred to herein as "re-baselining", provides a more accurate baseline that may be used for comparing with the measured operating data. In other words, re-baselining converts a baseline included in a generic fleet rule package to a customized baseline that more accurately represents proper operation of a specific unit.

In the exemplary embodiment, first facility 40, second facility 42, and third facility 44 are each located in a first region 100, and fourth facility 46, fifth facility 48, and sixth facility 50 are each located in a second region 102. Moreover, seventh facility 52, eighth facility 54, and ninth facility 56 are located in a third region 104. Boundaries of first region 100, second region 102, and third region 104 may be defined geographically to include facilities located within a predefined distance of one another. Alternatively, first region 100, second region 102, and third region 104 may be defined as facilities that are located in areas having substantially similar environments, for example, but not limited to, facilities located in areas having similar operating temperatures and/or humidity.

In the exemplary embodiment, second facility 42 includes a first unit 110, a second unit 112, a third unit 114, a fourth unit 116, a fifth unit 118, and a local condition assessment device 120. Furthermore, the plurality of sensors 14 included within system 10 includes a sixth sensor 122 associated with first unit 110, a seventh sensor 124 associated with second unit 112, an eighth sensor 126 associated with third unit 114, a ninth sensor 128 associated with fourth unit 116, and a tenth sensor 130 associated with fifth unit 118. Similarly, third facility 44 includes a first unit 140, a second unit 142, a third unit 144, a fourth unit 146, a fifth unit 148, and a local condition assessment device 150. Moreover, plurality of sensors 14 includes an eleventh sensor 152 associated with first unit 140, a twelfth sensor 154 associated with second unit 142, a thirteenth sensor 156 associated with third unit 144, a fourteenth sensor 158 associated with fourth unit 146, and a fifteenth sensor 160 associated with fifth unit 148.

Condition assessment system 10 may also include a central condition assessment device 170. As described above with respect to local condition assessment device 70, central condition assessment device 170 includes a processing device 172 and a memory device 174. Memory device 174 may be included within, or coupled to, processing device 172. In the exemplary embodiment, central condition assessment device 170 is coupled to, and receives data from, local condition assessment devices 70, 120, and 150. In an alternative embodiment, central condition assessment device 170 is coupled to plurality of data sensors 14 and receives data directly from data sensors 14. In the exemplary embodiment, central condition assessment device 170 analyzes data received from a plurality of facilities, for example, first facility 40, second facility 42, and/or third facility 44. Analyzing data from multiple facilities facilitates calculating an adjusted parametric baseline for a first type of unit based on data collected from multiple units included within first facility 40, and/or based on data collected from units included within different facilities, for example, first facility 40 and second facility 42. For example, central condition assessment device 170 may generate a new parametric baseline for a first model of compressor based on data received from all compressors of that model that are coupled to central condition assessment device 170. Central condition assessment device 170 then transmits the new parametric baseline to each facility that includes a compressor of that model for use in monitoring operation of the compressors of that model. Alternatively, central condition assessment device 170 generates a new parametric baseline for the first model of compressor based on data received from all compressors of that model that are coupled to central condition assessment device 170 and located within first region 100. The new baseline for first region 100 is transmitted to each of the facilities located in first region 100 that include a compressor of that model. By calculating an adjusted baseline for compressors based on region, the shared environment of those compressors enables generation of a parametric baseline customized for the environment in which the compressors are installed.

Figure 2:
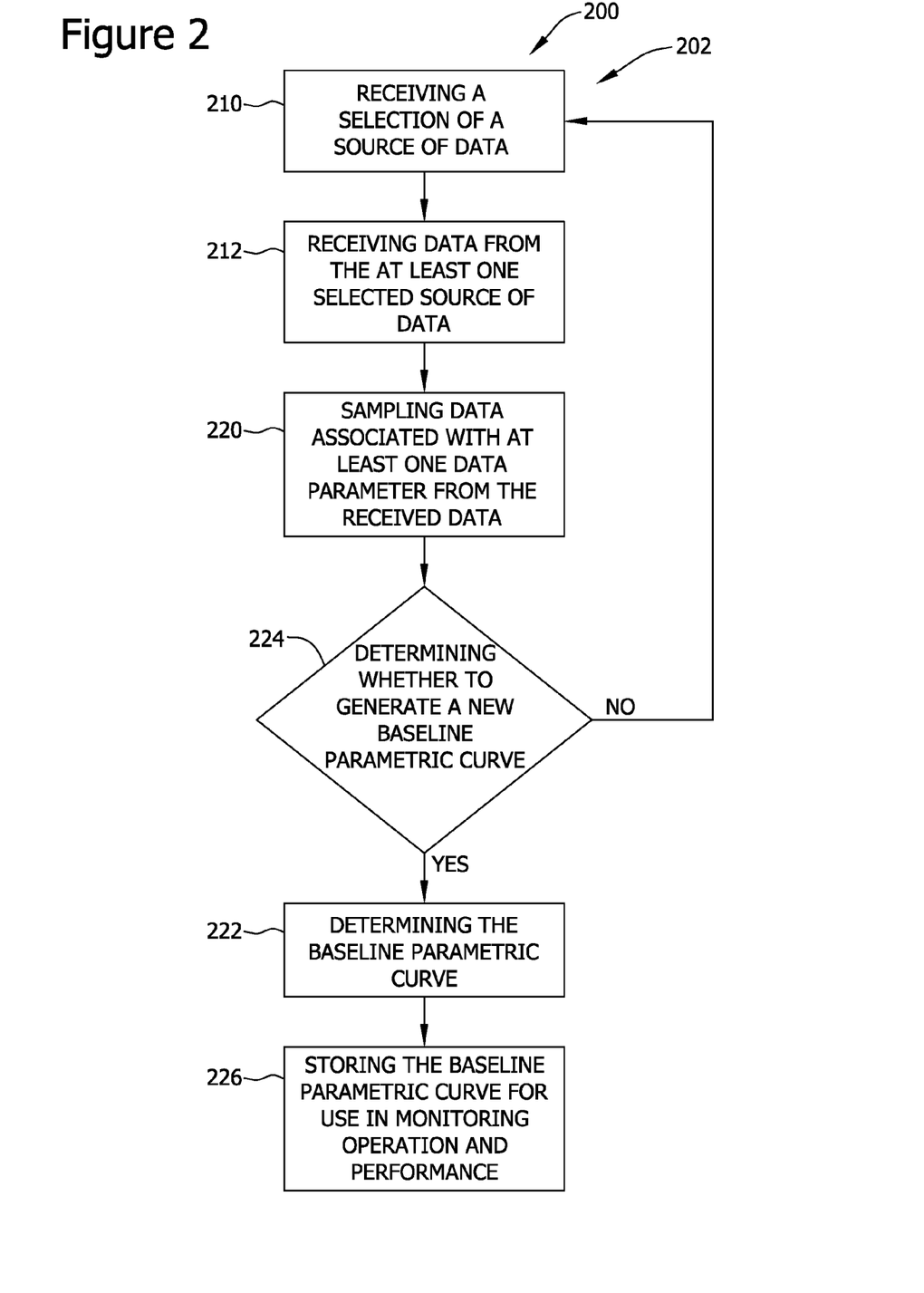
FIG. 2 is an exemplary flow diagram of a method that may be used to automatically maintain at least one baseline curve for use by the condition assessment system shown in FIG. 1.

FIG. 2 is a flow chart 200 of an exemplary method 202 that may be used for maintaining a baseline parametric curve representing normal operation of a first unit, for example, first unit 72 (shown in FIG. 1). As described above, first unit 72 is one of a plurality of substantially similar units included in an equipment fleet (i.e., first unit 72 is a first type of unit). In the exemplary embodiment, initially a selection of at least one source of data related to operation and performance of first unit 72 is received 210. For example, a selection from a user may be received 210, at local condition assessment device 70 (shown in FIG. 1), instructing device 70 to base the baseline parametric curve representing normal operation of first unit 72 on operating data collected by first sensor 82. Furthermore, a user selection may be received 210, at local condition assessment device 70, instructing device 70 to base the baseline parametric curve representing normal operation of first unit 72 on operating data collected by first sensor 82 and second sensor 84, that is coupled to another of the first type of unit (i.e., second unit 74). Moreover, a user selection may be received 210, at local condition assessment device 70, to base the baseline parametric curve representing normal operation of first unit 72 on operating data collected by all, or any combination of the sensors coupled to local condition assessment device 70 (i.e., first sensor 82, second sensor 84, third sensor 86, fourth sensor 88, and/or fifth sensor 90). Alternatively, a selection from a user may be received 210, at central condition assessment device 170, instructing device 170 to base the baseline parametric curve representing normal operation of first unit 72 on operating data collected by any combination of the plurality of sensors included within the facilities coupled to central condition assessment device 170 (i.e., any combination of sensors included within facilities 40, 42, 44, 46, 48, 50, 52, 54 and/or 56).

In the exemplary embodiment, method 202 also includes receiving 212 data from the at least one selected source of data. At least one of local condition assessment device 70 and central condition assessment device 170 receives 212 data from the sensors selected by the user. For example, data is received 212 from first sensor 82, from sensors associated with the plurality of substantially similar units (i.e., other units of the first type of unit), from all sensors located in a first region, for example first region 100 (shown in FIG. 1), or any combination thereof.

In the exemplary embodiment, method 202 also includes sampling 220 data associated with at least one data parameter from the received data and determining 222 the baseline parametric curve by fitting a curve to the data associated with the at least one sampled data parameter. With respect to a gas turbine, data parameters may include, but are not limited to, ambient temperature, exhaust gas temperature, oil temperature, component temperatures such as high pressure turbine shroud temperature, fuel flow, core speed, compressor discharge pressure, turbine exhaust pressure, generator output power, voltage, current, frequency, efficiency, exhaust temperature, firing temperature, vibration, inlet air temperature, ambient barometric pressure, wheel space temperature, bearing temperature, and bearing metal temperature. For example, at least one of local condition assessment device 70 and central condition assessment device 170 calculates the baseline parametric curve from a stored set of base functions and the data received from the at least one selected source of data.

In the exemplary embodiment, method 202 also includes determining 224 whether to generate a new baseline parametric curve. Local condition assessment device 70 and/or central condition assessment device 170 may identify a data acquisition logical flag within the received data that indicates that a change has been made to the first unit. For example, generating a new baseline parametric curve may be beneficial after performance of a maintenance action on first unit 72. The logical flag may be created by a user after performance of a maintenance action and delivered to local condition assessment device 70 and/or central condition assessment device 170.

Local condition assessment device 70 and/or central condition assessment device 170 may also determine that a change has been made to first unit 72, for example, a maintenance action has been performed on first unit 72 or a component of first unit 72 has been fixed or replaced. For example, a detection algorithm may be configured to determine that a change has been made to first unit 72 by identifying a change that exceeds a predefined level in one of the plurality of data parameters, by identifying changes in more than one of the plurality of data parameters, and by applying a rule to the plurality of data parameters.

Furthermore, an expected value of a parameter may be compared to a measured value to determine 224 whether to generate a new baseline parametric curve. If the difference between an expected value and a measured value of a parameter of first unit 72 exceeds a predefined anomaly limit for that parameter, a determination is made as to whether other parameters of first unit 72 support the anomaly. If the other parameters support the anomaly (e.g., the other parameters also vary from expected parameter values), a determination 224 is made that a new baseline parametric curve should be generated. If the other parameters do not support the anomaly, it is an indication that the equipment being monitored is not operating in accordance with the baseline parametric curve.

Furthermore, if a difference between expected values and measured values of a parameter monitored on multiple units exceeds a predefined anomaly limit for that parameter, and no cause for the anomaly limit is known, a determination 224 is made that a new baseline parametric curve should be generated. For example, a known cause of an anomaly detected in multiple units may include, but is not limited to, an ambient temperature shared by each unit. Detecting an anomaly in multiple units that cannot be explained by other sensor values is more likely an indication that the baseline parametric curve does not accurately represent proper operation of the units than an indication that multiple units have simultaneously developed operating anomalies. In an alternative embodiment, if a difference between expected values and measured values of a parameter monitored on multiple units exceeds a predefined anomaly limit for that parameter, and a cause for the anomaly limit is known, a determination 224 may still be made that a new baseline parametric curve should be generated. For example, if high ambient temperatures have caused multiple units to deviate from an expected value of a parameter, condition assessment system 10 may benefit from a calculation of a new baseline parametric curve that accounts for the higher ambient temperature.

Moreover, a rule or plurality of rules may be defined and applied by, for example, local condition assessment device 70 and/or central condition assessment device 170, to determine 224 whether a new baseline parametric curve should be generated. For example, the rule may include a "fuzzy logic" rule roughly defining when a new baseline parametric curve should be generated. For example, a combination of anomalies detected between expected values and measured values and a relative distribution of the number of units causing such anomalies may trigger calculation of a new baseline parametric curve.

In the exemplary embodiment, method 202 may also include storing 226 the baseline parametric curve for use in monitoring operation and performance of first unit 72 and/or of the plurality of substantially similar units. As described above, a fleet rule package includes generic baseline parametric curves generated for a fleet of units. Data associated with a measured data parameter is used to adjust at least one of the generic baseline parametric curves to better represent proper operation of first unit 72. The new baseline parametric curve is stored 226 in a memory unit, for example, memory device 94 and/or 174 (shown in FIG. 1), which may be positioned at local condition assessment device 70 and/or at central condition assessment device 170.

Figure 3:
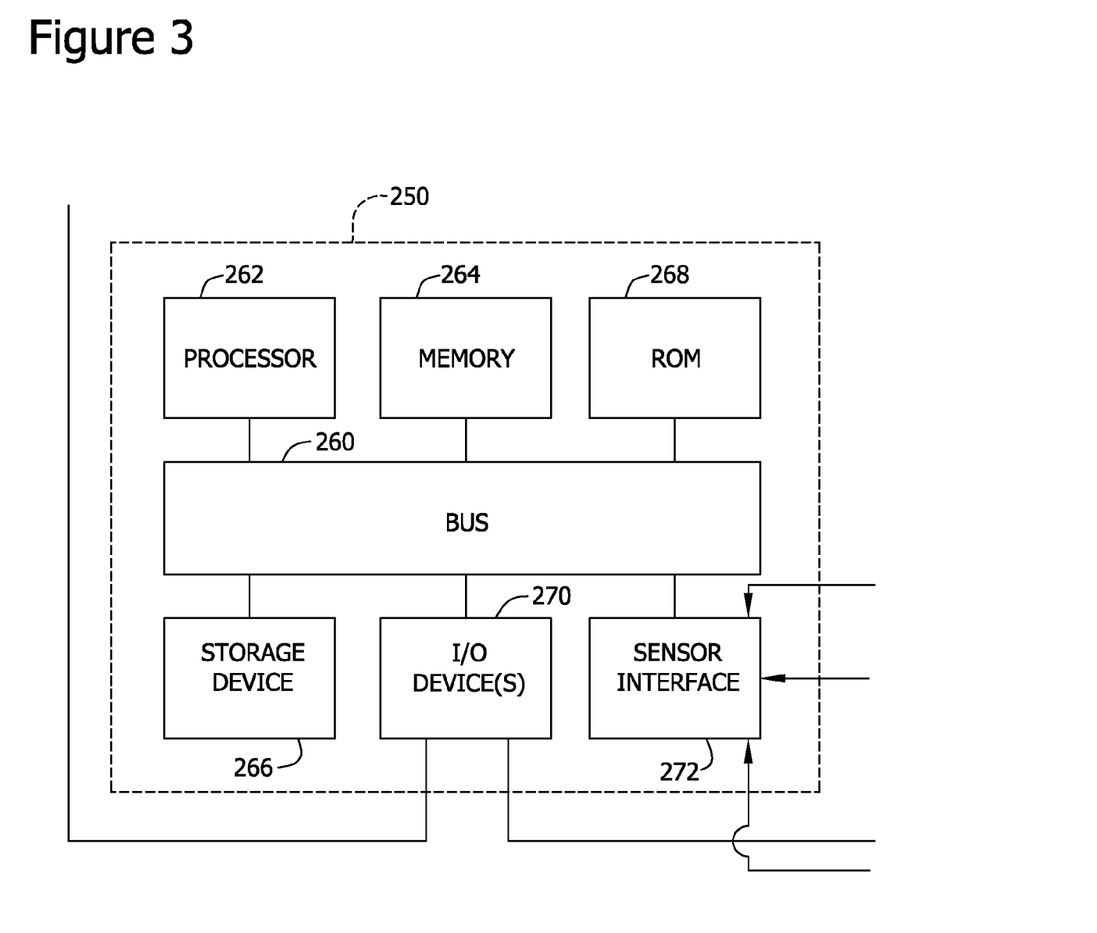
FIG. 3 is a block diagram of an exemplary processing device that may be used with the condition assessment system shown in FIG. 1.

FIG. 3 is a block diagram of an exemplary embodiment of a processing device 250 that may be included within local condition assessment devices 70, 120, or 150, and/or in central condition assessment device 170 (shown in FIG. 1). More specifically, FIG. 3 is an expanded block diagram of an exemplary embodiment of processing device 92, processing device 172, memory device 94, and/or memory device 174 (shown in FIG. 1). Processing device 250 is configured to perform operations associated with method 202 (shown in FIG. 2). Processing device 250 may also be referred to as a system controller and/or a condition assessment platform, for example, a central condition assessment platform (CCAP). In some embodiments, processing device 250 includes a bus 260 or other communications device to communicate information. One or more processor(s) 262 are coupled to bus 260 to process information, including data received from, for example, but not limited to, plurality of sensors 14 (shown in FIG. 1) and/or input/output device 96 (shown in FIG. 1). As used herein, the term processor broadly refers to a processor, a microcontroller, a microcomputer, a programmable logic controller (PLC), an application specific integrated circuit, and other programmable circuits. Furthermore, processor(s) 262 may be included within a computer. Aspects of the disclosure transform a general-purpose computer into a special-purpose computing device when configured to execute the instructions described herein.

Processing device 250 may also include one or more random access memories (RAM) 264 and/or other storage device(s) 266. RAM(s) 264 and storage device(s) 266 are coupled to bus 260 to store and transfer information and instructions to be executed by processor(s) 262. RAM(s) 264 (and/or storage device(s) 266, if included) can also be used to store temporary variables or other intermediate information during execution of instructions by processor(s) 262. Processing device 250 may also include one or more read only memories (ROM) 268 and/or other static storage devices coupled to bus 260 to store and provide static (i.e., non-changing) information and instructions to processor(s) 262. For example, static information may include, but is not limited to, a generic baseline parametric curve, and/or a previously stored baseline parametric curve. Instructions that are executed include, without limitation, resident conversion and/or comparator algorithms. The execution of sequences of instructions is not limited to any specific combination of hardware circuitry and software instructions.

Processing device 250 may also include, or may be coupled to, input/output device(s) 270. Input/output device(s) 270 may include, or be coupled to, any device known in the art to provide input data to processing device 250 and/or to provide outputs, such as, but not limited to, a baseline parametric curve and/or an alarm signal. Instructions may be provided to RAM 264 from storage device 266 including, for example, a magnetic disk, a read-only memory (ROM) integrated circuit, CD-ROM, and/or DVD, via a remote connection that is either wired or wireless providing access to one or more electronically-accessible media. In some embodiments, hard-wired circuitry can be used in place of or in combination with software instructions. Thus, execution of sequences of instructions is not limited to any specific combination of hardware circuitry and software instructions, whether described and/or shown herein. Also, in the exemplary embodiment, input/output device(s) 270 may include, without limitation, computer peripherals associated with an operator interface (e.g., a human machine interface (HMI)) such as a mouse and a keyboard (neither shown in FIG. 3), and/or input/output device 96 (shown in FIG. 1). Furthermore, in the exemplary embodiment, additional output channels may include, for example, an operator interface monitor and/or alarm device (neither shown in FIG. 3). Processing device 250 may also include a sensor interface 272 that allows processing device 250 to communicate with sensors, for example, plurality of sensors 14 (shown in FIG. 1). Sensor interface 272 may include one or more analog-to-digital converter that converts analog signals into digital signals that can be used by processor(s) 262.

Processing device 250 may be included within a personal or workstation computer. The data signals generated by sensors, for example, the plurality of sensors 14 (shown in FIG. 1), may be transferred to processing device 250 in any suitable manner, for example, but not limited to use of a removable computer-readable medium, such as a floppy disk, CD-ROM or other optical medium, magnetic tape or the like, or a wireless communication link. It is also possible to remotely transmit the data signals directly to processing device 250 for real-time processing. With any implementation, the monitoring algorithm can be stored on the condition assessment device and accessed from there, or alternatively, it could be accessed from a removable computer readable medium inserted into the appropriate drive of the unit. The monitoring algorithm could also be accessed via the Internet or another computer network. As used herein, the term "computer-readable medium" refers generally to any medium from which stored data can be read by a computer or similar device. This includes not only removable media such as the aforementioned floppy disk and CD-ROM, but also non-removable media such as a hard disk or integrated circuit memory device in a local condition assessment device or central condition assessment device.

Described herein are exemplary methods and systems for use in monitoring operation and performance of at least one of a plurality of units included within a fleet of substantially similar units. More specifically, the methods and systems described herein enable a generic fleet rule package to be modified to more accurately represent operation and performance of an individual unit within the fleet based on an operating environment and/or condition of the individual unit. The methods and systems described herein enable the generation and use of individualized baseline parametric curves, without requiring a manual update and/or without maintaining the baseline parametric curves for each individual unit. Automatically maintaining the baselines and associated alarm set points provides a commercial advantage by freeing a maintenance engineer or knowledge engineer from having to manually maintain baseline curves of units within a facility.

The methods and systems described herein facilitate efficient and economical maintenance of baseline parametric curves associated with fleet equipment. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A condition assessment system for monitoring the operation of at least one of a plurality of units included within a fleet of units, said system comprising:
    an input device configured to receive a selection of at least one source of data related to the operation of at least one of the plurality of units;
    a memory device including at least one parametric curve representing a baseline of normal operations of at least one of the plurality of units;
    a plurality of sensors associated with the at least one source of data, said plurality of sensors configured to sense data related to the operation of at least one of the plurality of units; and
    a condition assessment device configured to:
        receive data from each of said plurality of sensors, wherein the received data represents current conditions that said each sensor of said plurality of sensors is subject to;
        determine, based on a determination that received data exceeds a threshold and is an anomaly, whether to generate a new baseline parametric curve representing normal operation of the at least one of the plurality of units, based in part on data received from at least two of said plurality of sensors exceeding a threshold and being an anomaly;
        sample data associated with at least one data parameter from the received data; and
        generate, based on the determination of whether to generate, the new baseline parametric curve from the data associated with the at least one sampled data parameter.

2. A system in accordance with claim 1, wherein the fleet of units includes at least a first unit, a second unit, and a third unit, wherein the first and second units are located in a first geographic region, wherein the third unit is located in a second geographic region, and wherein each unit includes at least one sensor associated with at least one source of data, and wherein said condition assessment device is further configured to:
    receive data from the first unit and the second unit; and
    determine for the first unit whether to generate the new baseline parametric curve based in part on whether the received data from the first unit and the received data from the second unit exceed a threshold and being an anomaly.

3. A system in accordance with claim 2, wherein said condition assessment device is further configured to store the new baseline parametric curve for use in at least one of monitoring operation of the first unit, and monitoring operation of the plurality of units.

4. A system in accordance with claim 2, wherein said condition assessment device is further configured to at least one of identify a data acquisition logical flag within the received data that indicates that a change has been made to the first unit, and determine that a change has been made to the first unit.

5. A system in accordance with claim 4, wherein said condition assessment device is further configured to at least one of:
identify a change that exceeds a predefined level in data associated with one of the plurality of data parameters;
identify changes in data associated with more than one of the plurality of data parameters; and
apply a logic rule to the data associated with the plurality of data parameters.

6. A system in accordance with claim 1, wherein said condition assessment device is further configured to calculate the new baseline parametric curve from a stored set of base functions and from the current environmental condition data received from the at least one selected source of data.

7. A system in accordance with claim 1, wherein the condition assessment device is further configured to determine whether to generate a new baseline parametric curve based on a fuzzy logic rule.

8. A method of maintaining a new baseline parametric curve representing normal operation of a first unit, wherein the first unit has a parametric curve associated with it that represents a baseline of normal operation, and wherein the first unit is one of a plurality of units included in an equipment fleet, said method comprising:
receiving a selection of at least one source of data related to the operation of the first unit, wherein the at least one source of data is associated with a plurality of sensors configured to sense data related to the operation of the first unit;
receiving data from each of the plurality of sensors, wherein the received data represents current conditions that the first unit is subject to;
determining, based on a determination that data exceeds a threshold and is an anomaly, whether to generate the new baseline parametric curve representing normal operation of the first unit, based in part on received data from at least two of said plurality of sensors exceeding a threshold and being an anomaly;
sampling, using a computer program embodied on a non-transitory computer readable medium, data associated with at least one data parameter from the received data; and
generating, based on the determination of whether to generate, the new baseline parametric curve by fitting a curve to the data associated with the at least one sampled data parameter.

9. A method in accordance with claim 8, wherein the plurality of units included in the fleet includes a second unit and a third unit, wherein the first and second units are located in a first geographic region, wherein the third unit is located in a second geographic region, and wherein each unit includes at least one sensor associated with at least one source of data, and wherein receiving data from the at least one selected source of data comprises:
receiving data from the first unit and the second unit; and
determining for the first unit whether to generate the new baseline parametric curve based in part on whether the received data from the first unit and the received data from the second unit exceed a threshold and is an anomaly.

10. A method in accordance with claim 8, further comprising storing the new baseline parametric curve for use in at least one of monitoring the operation of the first unit and monitoring the operation of the plurality of units.

11. A method in accordance with claim 8, wherein determining the new baseline parametric curve by fitting a curve to the data associated with the at least one sampled data parameter comprises calculating the new baseline parametric curve from a stored set of base functions and from the data received from the at least one selected source of data.

12. A method in accordance with claim 8, wherein determining whether to generate the new baseline parametric curve representing normal operation of the first unit is further based on a fuzzy logic rule.

13. A method in accordance with claim 8, wherein determining whether to generate the new baseline parametric curve comprises at least one of:
identifying a data acquisition logical flag within the received data that indicates that a change has been made to the first unit; and
determining that a change has been made to the first unit.

14. A method in accordance with claim 8, wherein sampling data associated with the at least one data parameter from the received data comprises sampling data associated with a plurality of data parameters from the received data, and wherein determining that a change has been made to the first unit comprises at least one of:
identifying a change that exceeds a predefined level in one of the plurality of data parameters;
identifying changes in more than one of the plurality of data parameters; and
applying a logic rule to the plurality of data parameters.

15. A method in accordance with claim 8, wherein receiving data comprises receiving data representing a schedule of maintenance performed on the first unit, and data representing usage of the first unit.

16. A condition assessment device for monitoring the operation of at least one of a plurality of units included within a fleet of units, wherein the at least one of the plurality of units has a parametric curve associated with it that represents a baseline of normal operation, said device comprising a processing device configured to store at least one code segment configured to instruct said processing device to:
receive a selection, from an input device, of at least one source of data related to the operation of at least one of the plurality of units, wherein the at least one source of data is associated with a plurality of sensors configured to sense data related to the operation of the at least one of the plurality of units;
receive data from each of the plurality of sensors associated with the at least one source of data, wherein the received data represents current conditions that each sensor of the plurality of sensors is subject to;
determine, based on a determination that data exceeds a threshold and is an anomaly, whether to generate a new baseline parametric curve representing normal operation of the at least one of the plurality of units, based in part on received data from at least two of said plurality of sensors exceeding a threshold and is an anomaly;
sample data associated with at least one data parameter from the received data; and generate, based on the determination of whether to generate, a new baseline parametric curve from the data associated with the at least one sampled data parameter.

17. A device in accordance with claim 16, wherein the at least one code segment is configured to instruct said processing device to:
   receive data from a first unit and a second unit of the plurality of units; and
   determine for the first unit whether to generate the new baseline parametric curve based in part on whether the received data from the first unit and the received data from the second unit exceed the a threshold and is an anomaly.

18. A device in accordance with claim 17, wherein the at least one code segment is configured to instruct said processing device to store the new baseline parametric curve for use in at least one of monitoring the operation of said first unit, and monitoring the operation of the plurality of units.

19. A device in accordance with claim 16, wherein the at least one code segment is configured to instruct said processing device to calculate the new baseline parametric curve from a stored set of base functions and from the data received from said at least one selected source of data.

20. A device in accordance with claim 16, wherein the at least one code segment is configured to instruct said processing device to determine whether to generate a new baseline parametric curve based on a fuzzy logic rule.

* * * * *